P. FRUEH.
ATTACHMENT FOR POST AUGERS.
APPLICATION FILED MAR. 10, 1913.
1,084,937.
Patented Jan. 20, 1914.
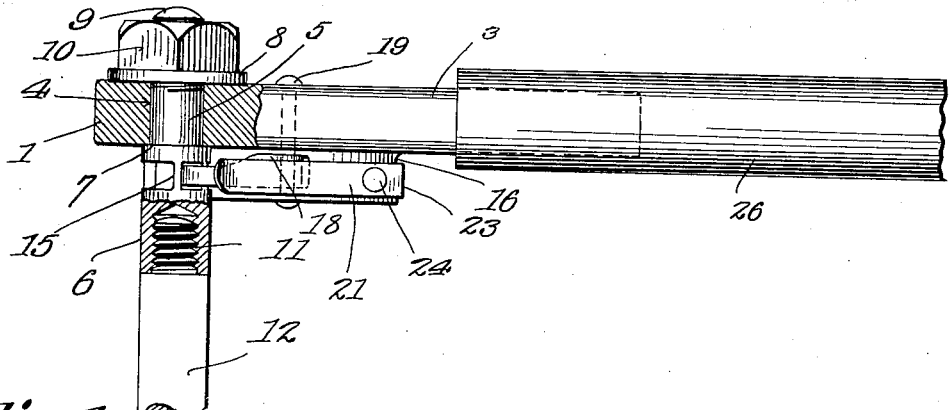
Fig. 1.
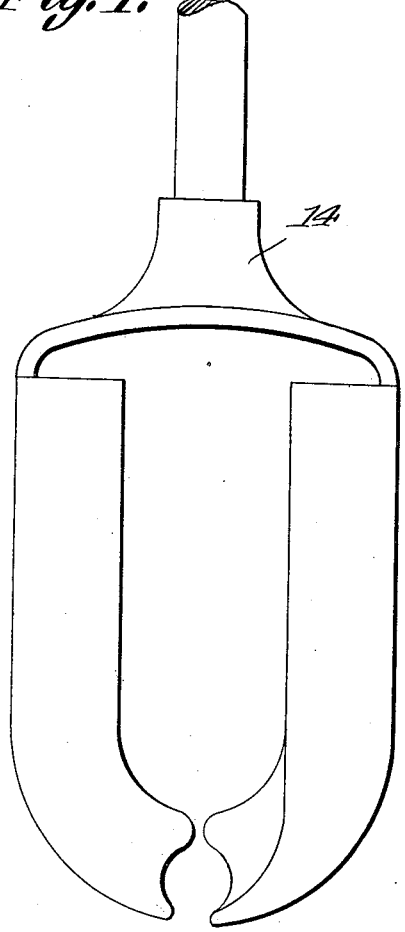
Fig. 2.
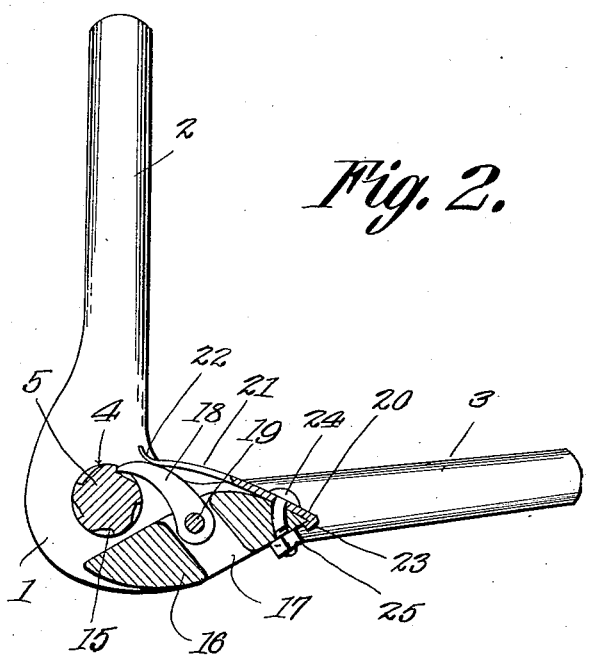
Witnesses
Peter Frueh
Inventor,
by C. A. Snow & Co.
Attorneys.

UNITED STATES PATENT OFFICE.

PETER FRUEH, OF DONNELLSON, IOWA.

ATTACHMENT FOR POST-AUGERS.

1,084,937. Specification of Letters Patent. Patented Jan. 20, 1914.

Application filed March 10, 1913. Serial No. 753,373.

*To all whom it may concern:*

Be it known that I, PETER FRUEH, a citizen of the United States, residing at Donnellson, in the county of Lee and State of Iowa, have invented a new and useful Attachment for Post-Augers, of which the following is a specification.

The device forming the subject matter of this application is a pawl and ratchet structure adapted to be assembled with a post hole auger, to secure a rotation of the auger and to permit a hole to be bored by the auger close to a wall and in other restricted places in which the auger cannot be manipulated by a transverse handle of ordinary construction.

The invention aims to improve generally, devices of that type to which the present invention appertains, and to provide novel means for mounting the pawl and its actuating spring.

With the above and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawing Figure 1 shows the invention in side elevation, applied to a post hole auger, parts being sectioned; and Fig. 2 is a transverse horizontal section of the structure shown in Fig. 1.

In carrying out the invention, there is provided a head 1 from which radiate angularly disposed arms 2 and 3. In the head 1 there is an opening 4 in which is journaled a shaft 5 provided at its lower end with a socket 6, the socket 6 being of slightly larger diameter than the shaft 5, thereby forming a shoulder 7 adapted to abut against the lower face of the head 1. The upper end 9 of the shaft 5 extends above the head 1 and is threaded to receive a nut 10, there being a washer 8 disposed between the nut 10 and the head 1. The socket 6 is threaded in its interior as indicated at 11, to receive the shank 12 of an auger 14, although, obviously, any other suitable means may be provided for connecting the shank 12 of the auger operatively with the socket 6. The socket 6 is peripherally provided with ratchet teeth 15 projecting downwardly from the arm 3 and located adjacent the head 1 and extended upon the head 1 is a lug 16. The lug 16 is provided with an opening 17, the axis of which is approximately parallel to the plane defined by the arms 2 and 3. A pawl 18 is located in the opening 17 and is supported for pivotal movement upon a pin 19 removably mounted in the lug 16 and in the arm 3 and extended across the opening 17. At its outer end, the lug is brought to an edge as shown at 20. A spring tongue 21 abuts against one end face of the lug 16, the free end of the spring tongue 21 being curved as indicated at 22, the curved portion 22 of the spring tongue bearing against the pawl 18 and serving to hold the pawl engaged with the ratchet teeth 15 of the socket 6. At its butt the spring tongue 21 terminates in an angular flange 23. The flange 23 and the body portion of the spring 21 define an angle in which the edge 20 of the lug 16 is received. A curved bolt 24 extends through the lug 16 and through the spring tongue 21 and upon the bolt 24 is mounted a nut 25.

In practical operation, a tube 26 is mounted upon one of the arms 2 and 3, or, if the device is to be operated by two persons, a tube 26 may be mounted upon each of the arms 2 and 3. Rotatory movement is thus imparted to the head 1 and the pawl 18 engaging the ratchet 15 of the socket 6, will impart rotatory movement to the socket and to the post hole auger 14.

Owing to the fact that the arm 3 is provided with the depending lug 16, the arm is strengthened and is well adapted to receive the thrust of the pawl 18. Owing to the fact that the lug 16 is provided with the opening 17, the pawl 18 may be thrust inwardly, into the opening 17, springing the resilient tongue 21 outwardly, whereupon the connecting pin 19 may be passed through the pawl. The operation of mounting the pawl is thus rendered easy and the pawl may thus be readily inserted into place after the spring tongue 21 has been mounted on the lug 16. Owing to the fact that the spring tongue 21 is provided with the flange 23 which overlaps one side face of the lug, the tongue is prevented from having a pivotal movement upon the bolt 24, and as a consequence, the curved end 22 of the tongue is prevented from slipping off the pawl 18.

Having thus described the invention, what is claimed is:—

A device of the class described comprising in a one piece structure, a head, arms disposed at an acute angle to each other and projecting radially from the head, and a lug projecting from the head and one arm and forming a reinforcement; the head having an opening, and there being an opening in the lug, independent of the opening in the head; a shaft journaled in the opening in the head and having a ratchet; a pawl pivoted in the opening in the lug and engaging the ratchet; and spring means for maintaining the pawl engaged with the ratchet.

In testimony that I claim the foregoing as my own, I have hereto affixed my signature in the presence of two witnesses.

PETER FRUEH.

Witnesses:
H. HEBEL,
A. T. CRUIKSHANK.

---

Copies of this patent may be obtained for five cents each, by addressing the "Commissioner of Patents, Washington, D. C."